INVENTORS
ERWIN A. SCHUMACHER
LAWRENCE J. ULINE
HELIO A. TRULL

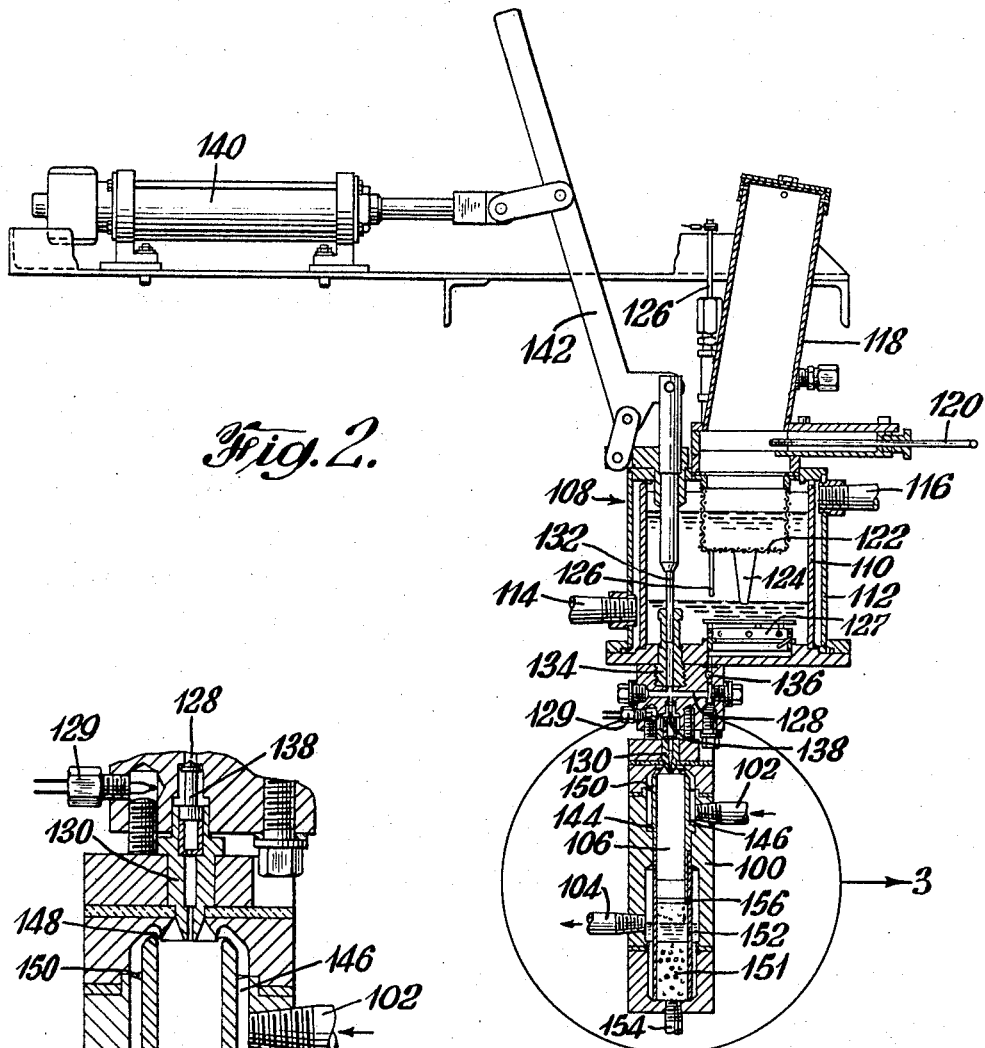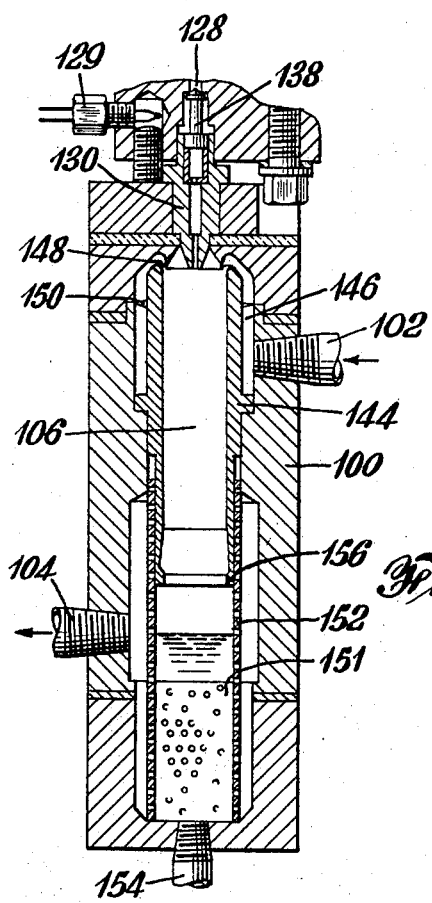

BY John R. ......
ATTORNEY

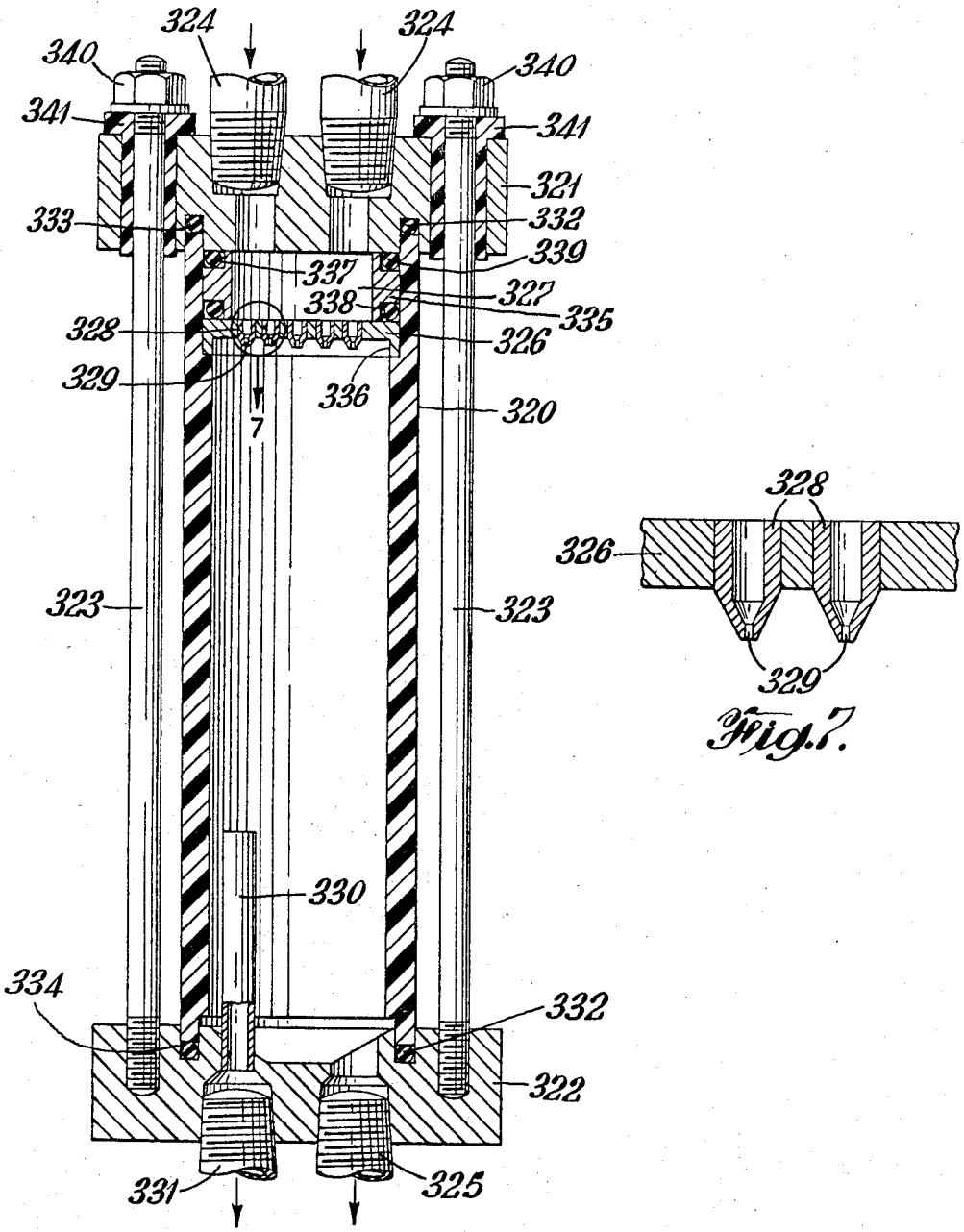

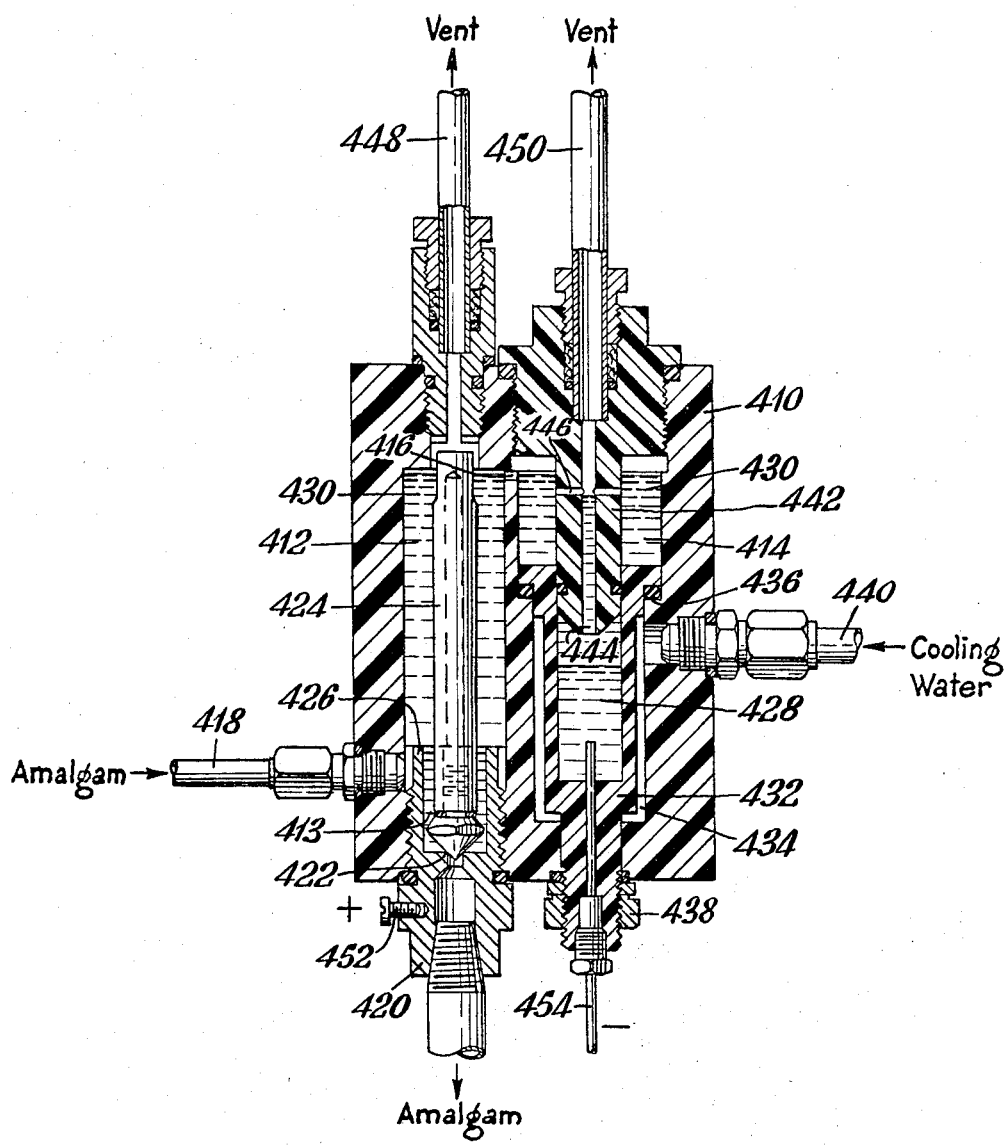

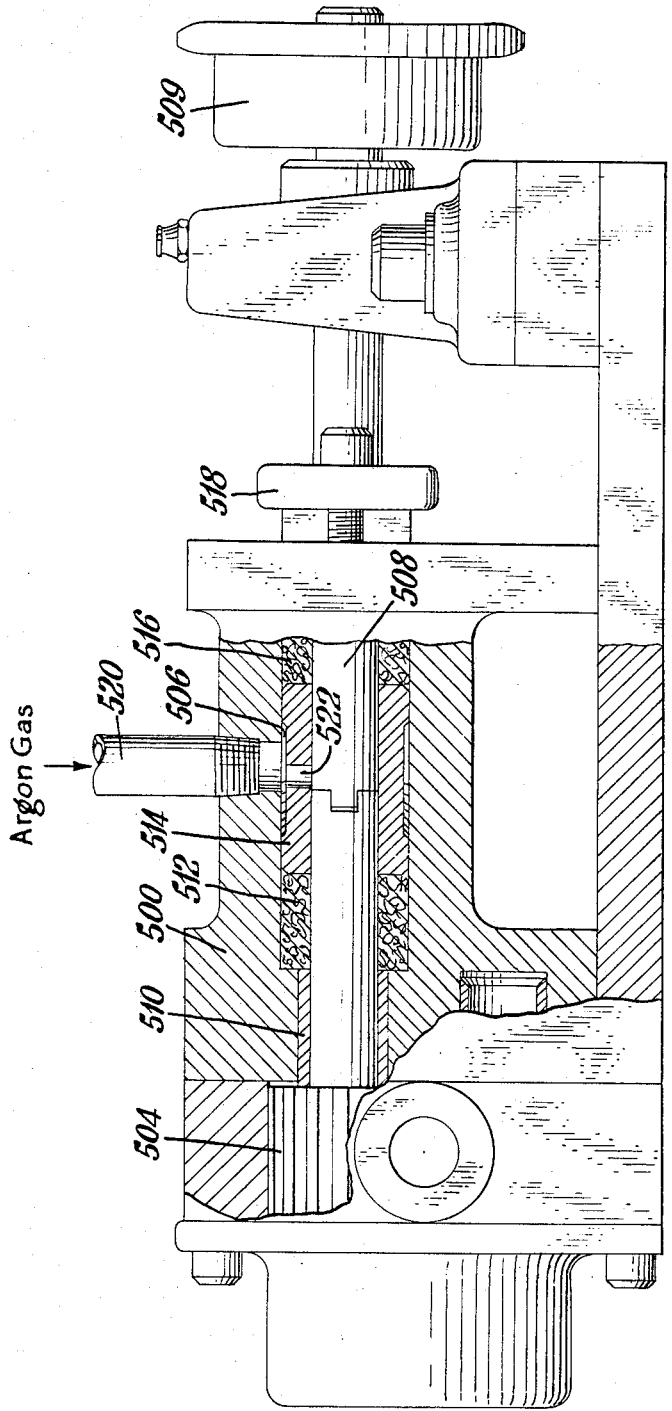

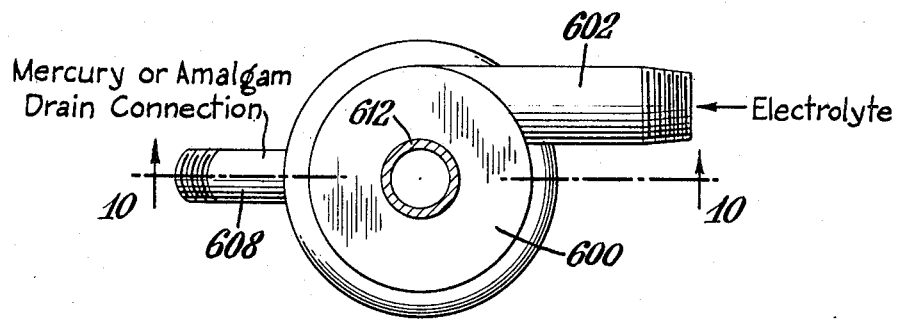
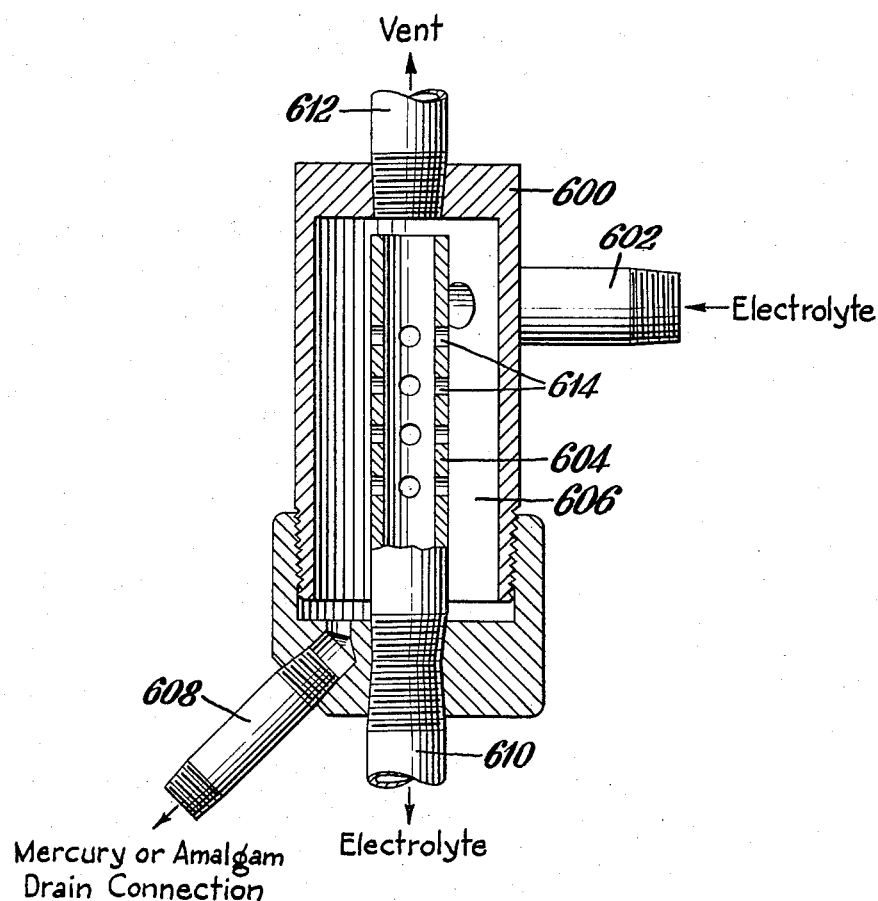

United States Patent Office 3,378,405
Patented Apr. 16, 1968

3,378,405
ANODIC MATERIAL AMALGAM-OXIDANT
FUEL CELL
Erwin A. Schumacher, Cleveland, and Lawrence J. Uline, Lakewood, Ohio, and Helio A. Trull, St. Petersburg, Fla., assignors to Union Carbide Corporation, a corporation of New York
Filed Dec. 23, 1963, Ser. No. 332,385
6 Claims. (Cl. 136—86)

The invention relates to an anodic material amalgam-oxidant fuel cell, and particularly refers to a fuel cell of this character employing sodium in a liquid amalgam as the anode. More specifically, the invention refers to a battery system for the continuous operation of such a cell and to several components of the system.

A primary galvanic cell has been developed which is generally known as a sodium amalgam-oxidant fuel cell. This cell usually comprises an anode, such as a substantially flat or cylindrical conductive plate; a cathode, such as a gas-permeable electrolyte-repellent carbon body; and an electrolyte, such as an aqueous solution of sodium hydroxide or sodium chloride, electro-chemically joining the anode and cathode. During cell operation, a gaseous oxidant is fed into the cathode and a liquid sodium amalgam is led into the anode and permitted to flow down the anode faces. The dissolved sodium in the amalgam will then react electrochemically to produce electricity and a product of reaction, which is sodium hydroxide with oxygen as the oxidant and sodium chloride with chlorine as the oxidant.

For continuous cell operation, the concentration of the product of reaction in the electrolyte must be kept within proper limits, the oxidant must be supplied to the cathode continuously, and sodium amalgam of the proper concentration must be fed to the anode continuously. A battery system which will meet these requirements is needed if continuous operation of the fuel cell is to be effected.

The primary object of the invention, therefore, is to provide a battery of anodic material amalgam-oxidant fuel cells and especially cells of the character employing sodium in a liquid amalgam as the anode, which battery is capable of substantially continuous operation.

Another object is to provide a circulation and regeneration system for sodium amalgam.

Another object is to provide a pump suitable for moving liquid sodium amalgam and other materials.

Another object is to provide a separator for separating a dense liquid, such as sodium amalgam, from a lighter liquid.

Another object is to provide an apparatus for regenerating depleted sodium amalgam with sodium to form an enriched sodium amalgam.

Further objects will be apparent from the following description of the invention taken in conjunction with the drawings wherein:

FIG. 2 is a sectional view of an amalgam regenerator in accordance with the invention;

FIG. 3 is a fragmentary sectional view of the regenerator illustrated in FIG. 2;

FIG. 6 is a sectional view of a dielectric interrupter for an amalgam stream;

FIG. 7 is an enlarged sectional view of the encircled portion of the dielectric interrupter shown in FIG. 6;

FIG. 8 is a sectional view of a reference cell for an amalgam stream;

FIG. 9 is a view partially in section of a pump made in accordance with the invention; and FIG. 10 is a sectional view of a separator made in accordance with the invention; and FIG. 11 is a perspective view of the top of the separator shown in FIG. 10.

Broadly, the above objects are achieved by an anodic material amalgam-oxidant battery comprising one or more fuel cells which may be of the type employing sodium in a liquid amalgam as the anode, an electrolyte circulation system, an oxidant supply system, an amalgam supply system, and electrical circuit means associated with the electrodes in the fuel cells. Each of these battery parts and their individual components will be described in detail hereinafter, including an apparatus for regenerating sodium amalgam, a pump which minimizes leakage of the pumped material, and an apparatus for separating two immiscible liquids, all of which are included within the scope of the present invention.

Figure 1:
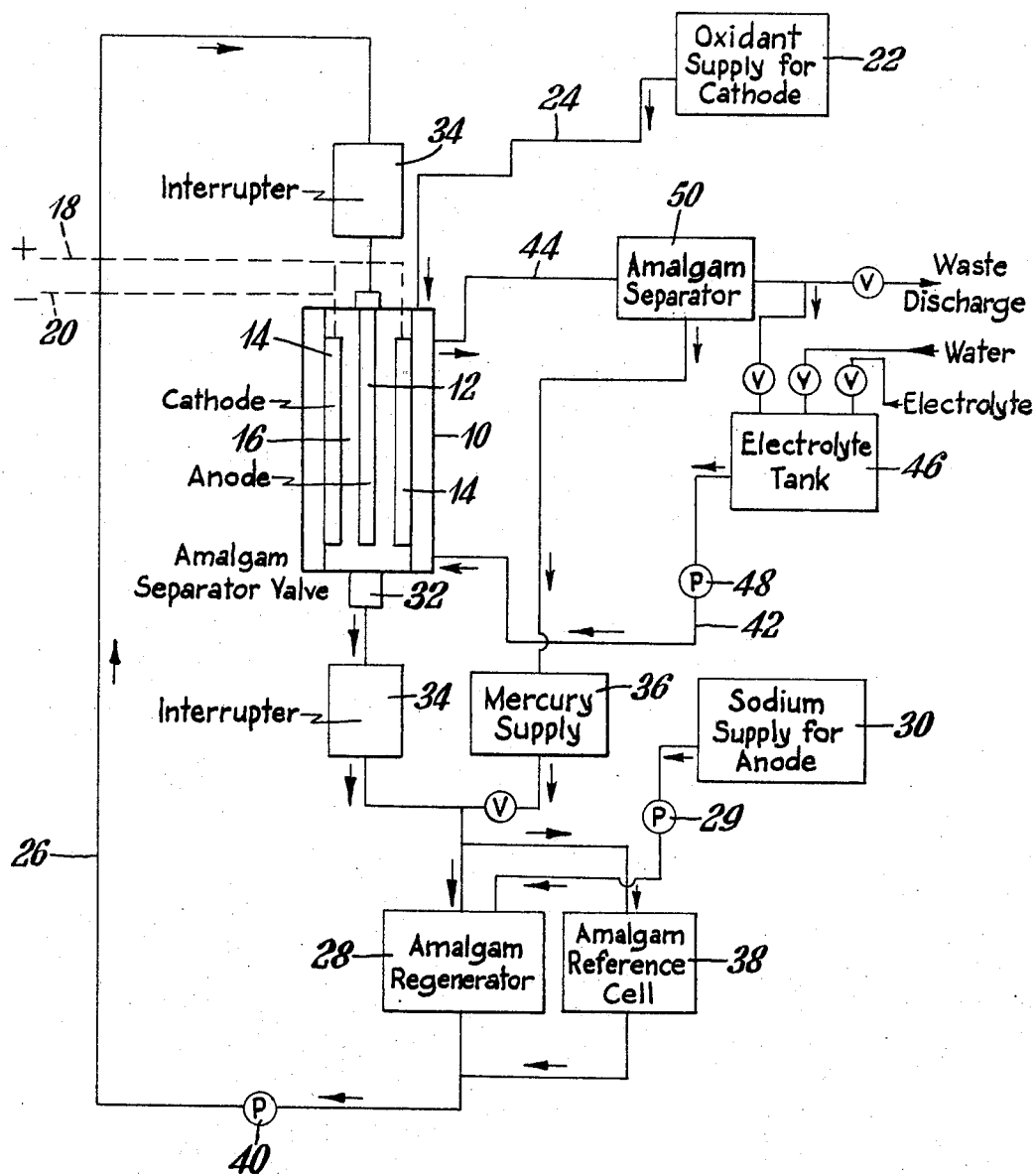
FIG. 1 is a schematic view of the fuel cell battery of the invention.

With reference to FIG. 1, which illustrates schematically an embodiment of the battery system of the invention, the sodium amalgam-oxidant battery 10 comprises an anode 12 and a cathode 14 on each side of the anode 12. The anode 12 is suitably made of a flat, low-carbon steel plate, and preferably has channels and holes therein, as described in the concurrently filed application Ser. No. 332,700 of Erwin A. Schumacher et al. The cathode 14 is suitably made of a gas-permeable, electrolyte repellent body made of carbon suitably catalyzed with a spinel catalyst, such as $CoO \cdot Al_2O_3$, which is described and claimed in U.S. Patents 2,615,932 and 2,669,598, which issued to A. Marko and K. V. Kordesch on Oct. 28, 1952, and Feb. 16, 1954, respectively. Other cathode constructions and other catalysts known in the art, however, are considered to be equivalents of the above-described cathode for purposes of the invention.

Between the anode 12 and each cathode 14 is an electrolyte 16, for example, an aqueous solution of sodium hydoxide and/or sodium chloride. The cell 10 delivers electrical energy to the electrical leads 18 and 20 when oxygen or other oxidant such as chlorine is supplied to the back of the cathods 14 and permitted to diffuse therethrough, and a liquid sodium amalgam is permitted to flow down the faces of the anode 12. As the electrodes are fed with the fuel and oxidant, the sodium will react electrochemically with the ions produced from the oxidant to produce a sodium compound and available electrical energy.

The oxidant can be readily supplied to the cathodes 14 since in general it will be in a gaseous form. A tank 22 suitably connected to the cathodes 14 by a supply pipe 24 or other conveying means is satisfactory as the entire oxidant supply system if the tank 22 and pipe 24 are maintained under a small positive pressure of the gaseous oxidant. Any impurities in the oxidant, such as when air is used for its oxygen content, can be bled from a place at or near the cathodes, either periodically or continuously. If the oxidant is a liquid, or is dissolved in a liquid, the supply system may require a pump in order to maintain a continuous supply of oxidant at the cathodes, but the system in any event is rather simple.

Since sodium amalgam is fluid only within narrow ranges at ordinary temperatures (up to about 0.65 weight percent sodium and between about 35 and 45 weight percent sodium), the supply of this material to the anode is a difficult problem. To aggravate the problem further, a sodium amalgam containing about 40 weight percent sodium is subject to rapid chemical reaction with the cell electrolyte, thereby requiring for ordinary operations the use of an amalgam containing less than about 0.65 weight percent sodium at room temperatures if good efficiency is to be expected. Since large amounts of mercury are thus required as a carrier for the sodium, it is desirable to provide a system which recirculates the depleted amalgam and which regenerates the depleted amalgam with more sodium.

In accordance with the invention, the sodium amalgam supply system comprises a pipe 26 or other suitable conveying means, the influent end of which communicates with the top end of the anode 12 and the effluent end of which communicates with the bottom of the cell 10. As shown by the arrows in FIG. 1, the amalgam is circulated through the pipe 26 and is supplied to the top of the anode 12 where it flows by gravity down the faces of the anode 12. The amalgam then falls from the anode 12 to the bottom of the cell 10 where it enters the pipe 26 and flows through the amalgam supply system again. If desired, the pipe 26 may be connected directly or indirectly to the bottom of the anode 12 rather than the cell 10 for the collection of the falling amalgam, and such is considered to be within the skill of the art, and to be an equivalent of the above-described preferred construction.

The depleted amalgam leaving the cell 10 is enriched with additional sodium in a sodium amalgam regenerator 28 to provide more sodium amalgam suitable for use as an anodic fuel. The regenerator 28 preferably comprises a housing having a reaction chamber therein, amalgam inlet and outlet means communicating with the reaction chamber and suitably connected with the pipe 26, and means communicating with the reaction chamber for controllably injecting a required amount of sodium into the reaction chamber. Preferably, the inlet means is located near the top of the chamber, and the outlet means is located above the lowest part of the chamber to allow a pool of amalgam to collect in the chamber. The sodium is then preferably injected into the pool of amalgam through a nozzle at the top of the chamber, thereby preventing substantial formation of solid sodium amalgam particles.

With reference to FIG. 2, which illustrates a preferred embodiment of an apparatus for regenerating sodium amalgam, the apparatus there shown comprises a housing 100 having an amalgam inlet means 102 near its top and amalgam outlet means 104 near its bottom communicating with a reaction chamber 106 therein. A means 108 for injecting a controllable amount of liquid sodium into the reaction chamber 106 is associated with the housing 100, and comprises a tank 110 with a cylindrical jacket 112 therearound to define an annular space between the two and hot oil inlet 114 and outlet 116 in the jacket 112 for circulating hot oil through the annular space and thereby melting the sodium in the tank 110. A charging hopper 118 for adding the sodium to the tank 110 is located above the tank, and a gate valve 120 separates the interior of the hopper 118 from the interior of the tank 110. Referring back to FIG. 1, the tank 110 and charging hopper 118 is broadly represented by a sodium supply 30 connected to the regenerator 28.

Since solid sodium is added to the hopper 118 a filter and melting basket 122 is preferably disposed under the gate valve 120 to ensure that only molten sodium is permitted to flow from the tank 110 to the reaction chamber 106. A heat conductor 124 suitably made of copper is preferably disposed on the bottom of the basket 122 in such a case to maintain the basket 122 in a hot condition by conveying heat from the molten sodium pool in the tank 110 when the pool is at low level. A sodium level probe 126 may also be installed in the tank 110 to indicate the level of molten sodium within the tank.

A conduit 128 connects the interior of the tank 110 with an injection nozzle 130 located in or near the top of the housing 100 and communicating with the reaction chamber 106, and a filter screen 127 over the end of the conduit 128 in the tank 110 prevents any solid particles of foreign material, for example, sodium oxide, in the tank 110 from entering and clogging the conduit 128 or the nozzle 130. A thermocouple 129 and an electrical heating means (not shown) is disposed near the conduit 128 to maintain the conduit at an elevated temperature.

The molten sodium is pumped from the tank 110 through the nozzle 130 by a piston 132 in a cylinder 134 which opens into the conduit 128. The piston 132 and cylinder 134 are broadly refered to in FIG. 1 as sodium pump 29. An inlet check valve 136 is located in one end of the conduit 128 and an outlet check valve 138 is located in the other end just above the nozzle 130. The piston 132 is connected to and operated from a double acting air cylinder 140, which may be automatically actuated, by a suitable linkage 142 which operates the piston 132 in a vertical reciprocating motion. As the piston 132 moves up in the cylinder 134, sodium is drawn into the conduit 128 from the tank 110 through the inlet check valve 136, but the outlet check valve 138 remains closed. On the down stroke, the inlet check valve 136 is forced into a closed position by the flow, and the sodium passes through the outlet check valve 138 into the nozzle 130 and subsequently into the reaction chamber 106.

Referring now to FIG. 3 which is an enlarged view of the housing 100 and its related parts in FIG. 2 an annular insert or sleeve 144 is placed in the upper portion of the housing 100 and spaced from the walls of the chamber 106 to form an annular space 146 therearound between the walls and the insert 144, which space communicates with the amalgam inlet means 102. The insert 144 fits against the walls of the chamber 106 at the bottom of the insert or at a point below the amalgam inlet means 102, and forms a weir 148 at its top, thus causing all inlet amalgam to flow up through the annular space 146 and over the weir 148 in order to enter the reaction chamber 106.

The insert 144 preferably extends down into the reaction chamber 106 to a point near the amalgam outlet means 104, as shown in the drawing, to provide separate inner and outer compartments within the housing 100. The insert 144 may be referred to as a means for causing influent amalgam to flow down into the chamber substantially only near the walls of the chamber, and constructions other than the one described above will be apparent to persons in the art. The main purpose is to effect a protective cylindrical flow of influent amalgam on the walls of the chamber 106, thus protecting the walls from the accumulation of sodium-rich solid amalgam particles.

In the construction shown in FIG. 3, a whirling means 150 is preferably placed in the annular space 146 to impart a centrifugal motion in the influent amalgam as it flows over the weir 148. The whirling means 150 may comprise a spiral fin, a plurality of spaced directional vanes, and the like. The centrifugal motion along with the weir effect of the weir 148 effects a continuous protective coating of amalgam on the interior surface of the insert 144 and other exposed parts as the amalgam flows down into the lower portion of the chamber 106. Thus, the insert 144 and other exposed parts are protected from direct contact with molten sodium and the readily formed solid amalgam which would otherwise rapidly coat the walls, building up of the inside surface on the insert 144 to such an extent that the regenerator may become plugged and thereby rendered inoperative. This feature is very important if trouble-free operation is to be expected.

As discussed before, the amalgam outlet means 104 is located above the bottom of the chamber 106 to permit a pool of amalgam 151 to collect therein. The sodium injected into the chamber 106 through the injection nozzle 130 falls into this pool and reacts with the amalgam to form a homogeneous solution, since a relatively large amount of amalgam is present for reaction and for dissolution of the sodium. A few solid particles of amalgam high in sodium concentration may form, however, at least for a short time, and these particles must be kept from entering the amalgam outlet 104 and thereby clogging the system. A means for preventing these particles from entering the outlet 104 is provided by a screen 152 disposed over the outlet 104 or between the outlet 104 and the main area of reaction near the center of the amalgam pool 151. The screen 152 is preferably a cylinder having a plurality of small holes therein. The solid amalgam particles will dissolve in the pool 151 after a short time. A pool drain 154 is preferably provided at the bottom of the housing 100 to permit easy disassembly for maintenance purposes.

An improved reaction can be obtained if the cylindrical flow of amalgam down the inside of the insert 144 is forced in towards the axis just above the pool 151 of amalgam. The sodium falling from the injection nozzle 130 will then contact the amalgam above the pool 151 while the amalgam is still in an agitated state, and an improved mixing of the reactants and an improved reaction will be effected. The cylindrically flowing amalgam can be forced in towards its axis by a number of means, but a curl or bead 156 on the bottom end of the insert 144 is preferred.

Although the addition of liquid sodium to the reaction chamber is preferred, it is possible to add solid sodium by a suitable extrusion mechanism. Furthermore, it may be desirable to employ an atmosphere of a gas inert to sodium and mercury, such as argon and other rare gases, in the amalgam regenerator.

Referring back to FIG. 1, the sodium amalgam supply system preferably contains an amalgam separator 32 near the amalgam effluent end of the cell 10 to minimize entry of electrolyte into the sodium amalgam system, since entrained electrolyte will react with the sodium amalgam to form solid particles, which may clog the pipe 26 or other parts. Other components of the preferred system include dielectric interrupters 34 disposed in the system near the cell 10 to isolate electrically each cell from the main portion of the sodium amalgam supply system and from other cells of the battery. If the battery comprises only one cell, the interrupters are unnecessary since the voltage will be the same between all parts of the supply system if the parts are electrically isolated from grounds and the like. For two or more cells, it is preferable, however, to have two dielectric interrupters per cell disposed in the supply system, one near the amalgam influent end of the cell and the other near the effluent end. The regenerator 28 and other components will then not have to be electrically isolated from grounds and the like, and no short-circuits will develop between cells.

The sodium amalgam supply system also preferably includes a mercury supply tank 36 for adding mercury to the system as necessary, and if automatic regeneration is desired, a reference cell 38 for monitoring the concentration of the sodium amalgam in the system and for controlling the rate of sodium addition to the regenerator 28 from the sodium supply 30 when the reference cell 38 is used in combination with suitable electrical equipment (not shown) for this purpose.

The amalgam separator 32, the dielectric interrupters 34, and the reference cell 38 can be made in any manner which effects their purposes, but the constructions described below are preferred.

Figure 5:
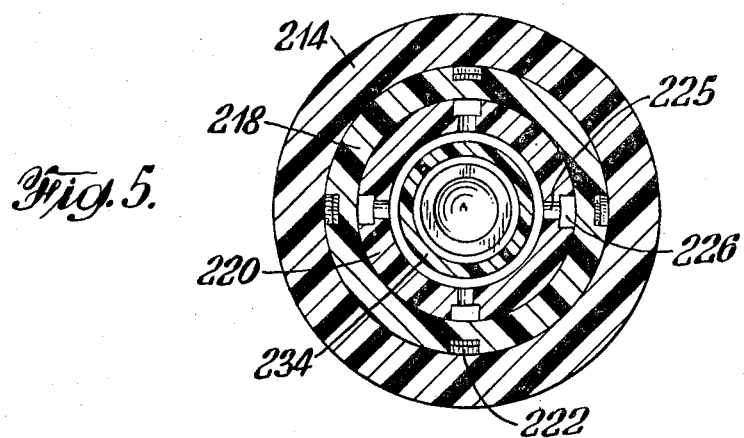
FIG. 5 is a sectional view of the separator taken along line 5—5 in FIG. 4.
Figure 4:
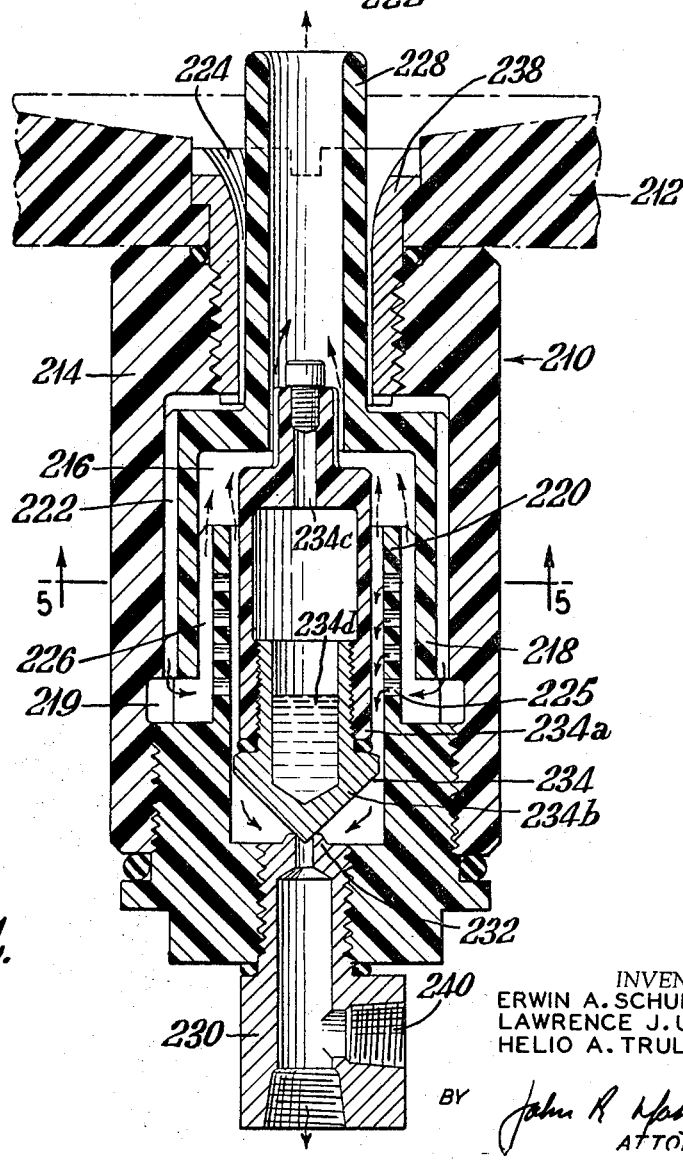
FIG. 4 is a sectional view of an amalgam separator.

The amalgam separator 32 is preferably constructed as described and claimed in the application Ser. No. 332,696, filed concurrently herewith by Lawrence J. Uline, et al., which is incorporated herein by reference. Referring now to FIGS. 4 and 5, which are sectional views of the preferred separator 210 connected to a fuel cell container 212, the separator 210 comprises a housing 214 having a chamber 216 therein with a first sleeve 218 extending from the top of the chamber 216 almost to its bottom, thereby leaving a horizontal flow chamber 219 between the first sleeve 218 and the bottom of the chamber 216 at this point. A second sleeve 220 disposed within the first sleeve 218 extends from the bottom of the chamber 216 toward its top for a substantial distance, a distance at least above the bottom of the first sleeve. The lengths of the sleeves 218 and 220 are not particularly critical, but the bottom of the first sleeve 218 should be below the top of the second sleeve 220, preferably overlapping for a substantial distance, to minimize the possibility of turbulence near the wall of the chamber 216 reaching the central portion of the chamber 216.

A first liquid conduit means 222, which lies between the wall of the chamber 216 and the first sleeve 218, connects with a liquid inlet means 224 and extends to the bottom of the first sleeve 218 where it joins the horizontal flow chamber 219. A second liquid conduit means 226 communicates with the horizontal flow chamber 219 and extends up between the two sleeves 218 and 220 to the top of the second sleeve 220 where it communicates with the inner portion of the chamber 216. At least one orifice 225 drilled in the sleeve 220 connects the horizontal flow chamber 219 with the inner portion of the chamber 216 in a manner which provides substantially horizontal flow along this path. Thus, a liquid mixture can enter the housing 214 by the liquid inlet means 224, flow down the first liquid conduit means 222, and then to the chamber 216 in a substantially horizontal and laminar manner, thereby permitting the liquid mixture to separate in the chamber 216.

The first and second conduit means 222 and 226 may consist of one or more grooves in one or both of the sleeves 218 and 220, as better shown in FIG. 5, or they may consist of annular spaces caused by spacing the first sleeve 218 from the wall of the chamber 216 and the second sleeve 220 from the first sleeve 218. The horizontal flow chamber 219 may consist of small holes drilled in the first sleeve 218 near its bottom, or may consist of a space caused by the first sleeve 218 being short of the bottom of the chamber 216 at that point. Other modifications will be apparent to those in the art.

If the horizontal flow chamber 219 is long enough to keep turbulence near the lateral circumference of the chamber 216 from reaching the inner portion of the chamber 216, the sleeve 220 may be shortened to a point where the orifice 225 is unnecessary to provide substantially laminar flow, or the sleeve 220 may even be omitted entirely. The construction described above, however, is definitely preferred, especially when a small separator is desired.

At the top of the chamber 216 is a first liquid outlet means 228 which communicates with the inner protion of the chamber 216 within the first sleeve 218. As shown in FIG. 4, the liquid outlet means 228 and the first sleeve 218 can be made of one integral piece, which is convenient for assembly, but the invention is not limited to such a construction. Preferably, this outlet means 228 extends into the interior of the cell container 212 to a point above the level of the liquid mixture collected therein. This allows the electrolyte separated from the liquid mixture by force of gravity to be returned to the main electrolyte body.

At the bottom of the chamber 216 is a second liquid outlet means 230 having an orifice seat 232 therein. A metal fitting screwed into the housing 214 will suffice as this outlet means. A float 234 is disposed in the chamber 216 and within the second sleeve 220 in cooperative relationship with the orifice seat 232. The weight of the float 234 should be adjusted so that it will open and close at a predetermined height of the denser liquid collected in the chamber 216. Thus, exit of the lighter liquid through the bottom outlet means 230 is effectively precluded. The float 234 preferably comprises a hollow plastic body 234a, a steel cone 234b attached to the bottom of the body, and an opening 234c or other means for introducing a liquid 234d, such as mercury, into the body to adjust the weight of the float 234.

As shown in the drawing, the separator 210 can be conveniently attached to the cell container 212 or other vessel by a hollow bolt 238 which fits across the bottom of the container 212 and screws into the housing 214. This construction is preferred since it permits the liquid outlet means 228 to extend into the cell container 212 and also provides the liquid inlet means 224 without further components. Many other equivalent constructions, however, will be apparent to those in the art.

It was found during operation of the separator that a vacuum sometimes developed below the orifice seat 232 in the bottom liquid outlet means 230, because of a flow of the amalgam away from the separator while the float 234 was closed. When such occurs, the float 234 will tend to remain closed too long. A vent 240 or other means for controlling the pressure below the orifice seat 232, is, therefore, preferably included in the liquid outlet means 230 to prevent such occurrences.

The dielectric interrupters 34 in FIG. 1 are preferably constructed as described and claimed in the application Ser. No. 332,504, now abandoned, filed concurrently herewith by Lawrence J. Uline and Helio A. Trull, which is incorporated herein by reference. Referring now to FIGS. 6 and 7, the preferred dielectric interrupter there shown comprises a hollow vertically disposed body 320, suitably a cylinder as hereinafter referred to, composed of a dielectric material substantially inert to the liquid flowing therethrough. Polymers of methacrylic acid esters are suitable. An inlet header 321 is mounted at the top of the cylinder 320 and an outlet header 322 is mounted at the bottom, each of which is suitably composed of metal, such as low carbon steel. Metal tie rods 323 bolt the cylinder 320 between an inlet header 321 and an outlet header 322. One or more liquid inlet pipes 324 are connected to the inlet header 321, and an outlet pipe 325 is connected to the outlet header 322. The pipes 324 and 325 may be considered as constituting part of the network of metal conduits represented by the number 26 in FIG. 1.

Liquid amalgam enters the dielectric interrupter through the pipe 324 within the inlet header 321, and then passes through a means for separating the flowing liquid into discrete droplets, which as shown in the drawing is preferably a disc-shaped distributor plate 326 having at least one orifice therein. The distributor plate 326 is mounted within the top of the cylinder 320 and is spaced from the inlet header 321 so as to define a chamber 327 thereabove in which the liquid amalgam collects as it enters from the pipe 324. Although a single orifice in the distributor plate 326 is sufficient to separate the flowing liquid into discrete drops at low flow rates, the distributor plate 326 preferably contains a plurality of closely spaced nozzles 328 supported therein. The plate 326 and nozzles 328 can be made of any material substantially inert to the flowing liquid, and when the liquid is amalgam, the material is preferably a low carbon steel.

It was found that the nozzles 328 having orifices 329 therein separate the flowing liquid into discrete drops better than orifices alone in the distributor plate 326. As shown in FIG. 7, the nozzles 328 preferably have a tapered end with an orifice 329 at the end of the taper. This construction prevents the flowing liquid from collecting on the underside of the plate as drops so large that when they fall the dielectric value across the device is destroyed. The preferred shapes of the nozzles 328, however, and even the desirability of their use are dependent on the viscosity of the flowing liquid, its ability to wet the distributor plate, and the flow rates involved. With a flowing amalgam, the use of tapered nozzles rather than orifices alone is definitely preferred.

The droplets formed by the action of the plate 326 and the nozzles 328 pass under the influence of gravity through the intermediate portion of the hollow body, and then fall to the bottom of the cylinder 320 where they collect in a liquid pool. The liquid amalgam is then carried off through the outlet pipe 325 within the outlet header 322. It will be understood that the droplets of liquid amalgam as they pass through the cylinder 320 are spaced from each other, the spacing between the droplets, although small, being sufficient to impart to the plurality of streams of discrete droplets a dielectric value which is high enough to prohbit a measurable flow of electric current through the droplet streams. As used herein, the term "dielectric value" means the measure of voltage potential required to pass a given electrical current through a medium, in this instance the plurality of streams of discrete droplets.

A ventilator-overflow means 330 is preferably mounted in the interrupter to prevent collection of the flowing liquid within the interrupter to such an extent that the collected liquid reaches the body of incoming liquid, thereby rendering the interrupter subject to short circuits, and to vent gases which may otherwise collect in the interrupter. As shown in FIG. 6, the ventilator-overflow means 330 comprises a tubular member extending upwards from the outlet header 322 to a height no higher than that which would significantly decrease the dielectric value of the interrupter. Thus, although the flow of liquid amalgam entering the dielectric interrupter through the inlet pipe 324 may fluctuate from time to time so that excessive quantities of amalgam could possibly collect in the liquid pool, the possibility of short circuits, by fluctuations in the height of the liquid in the device is avoided, since excess liquid amalgam overflows through the overflow means 330 and is carried off by the pipe 331 in the outlet header 322. It will be apparent that the overflow means 331 is not an essential part of the interrupter in some instances, especially when the hollow body 320 is made extremely long, the liquid flow is constant, or no gases need to be vented to or from the interrupter, but for applications in which a device of small dimensions is required, flow rates vary, or gases are required to be vented, the overflow-ventilator means 330 is an important part of the interrupter.

The hollow cylinder 320 is liquid-tightly sealed between the inlet and outlet headers 321 and 322 by O rings 332 of a suitable gasket material, such as natural or synthetic rubber, which are positioned within annular recesses 333 and 334 provided respectively in the inlet header 321 and outlet 322. Because a liquid amalgam of mercury, for example, a sodium amalgam, is toxic and should be handled with caution to prevent danger, adequate sealing of the dielectric interrupter is important.

An annular spacer ring 335 of a suitable material, such as low carbon steel, tightly engages the distributor plate 326 against the annular recessed shoulder 336 on the wall of the cylinder 320 which supports the plate 326. The spacer ring has an annular L-shaped recess 337 at its top peripheral edge and a similar recess 338 at its bottom edge within each of which is provided an O ring 339, suitably made of rubber. The O ring 339 seals the chamber 327 against leakage of liquid amalgam through the peripheral edge of the disc-shaped distributor plate 326 and prevents short-circuiting of the device by the passage of a continuous film of liquid down the walls of the cylinder 320.

Tie rods 323, as before mentioned, secure the inlet header 321 at the top and the outlet header 322 at the bottom of the cylinder 320. One end of the tie rods 323 is connected to the outlet header 322, the other end passing through holes in the inlet header 321 to take-up nuts 340. A flanged bushing 341 composed of a dielectric material, such as nylon, is provided within each of the holes in the inlet header 321 through which the tie rods 323 pass and electrically insulates the tie rods 323 from the inlet header 321. It will be evident that the provision of the flanged bushing 341 along with a hollow body 320 of dielectric material renders the interrupter electrically nonconductive between the inlet means 324 and outlet means 325. Of course, it is well within the skill of the art to provide other means for electrically insulating the interrupter between its ends, such as, for instance, by providing the tie rods 323 with sleeves of an insulating material, or by making the entire interrupter of a non-conductive material having suitable mechanical strength.

The reference cell 38 in FIG. 1 is preferably constructed as described and claimed in the application Ser. No. 332,688, filed concurrently herewith by Erwin A. Schumacher, which is incorporated herein by reference. Referring now to FIG. 8, the preferred reference cell there shown comprises a container 410 suitably made of a plastic or other material having a first chamber 412 and a second chamber 414 therein communicating with each other by means of a small hole 416 near the upper ends of the chambers 412 and 414. A liquid inlet 418 enters the chamber 412 through a wall of the container 410 near the bottom of the chamber 412 and permits the entrance of a liquid 413 to be monitored into the chamber 412, which liquid in the instant case is the sodium amalgam flowing in the pipe 26 in FIG. 1. At the bottom of the chamber 412, a liquid outlet 420 having an orifice seat 422 therein permits the exit of the liquid from the chamber 412. The outlet 420 and the seat 422 are suitably made of metal, but plastic and other materials are also suitable.

A float 424 having a cone-shaped lower end, which end is preferably made of metal, is disposed in the first chamber 412 in cooperative relationship with the orifice seat 422. The density of this valve may be adjusted so that it will open at a certain height of the flowing liquid 413 in the chamber 412 and close at lower heights. Thus, a relatively certain volume of the liquid to be monitored is maintained in the reference cell.

A weir 426 is preferably disposed in the chamber 412 between the inlet 418 and the outlet 420 to provide a more uniform flow of the liquid 413 through the reference cell. In addition, the weir 426 causes the exposed surfaces of the volume of liquid 413 to be formed of the liquid most recently entering the reference cell, thus reducing the time lag between the time the concentration of liquid is recorded and the time the liquid enters the reference cell. As shown in the drawing, the weir 426 can be an integral part of the outlet 420, but it may also be a separate part of an integral part of the container 410. The weir 426 in most instances will be in the form of a cylinder extending into the chamber 412 from its bottom.

The chamber 414 contains a reference electrode 428 consisting of any suitable reference material electrically insulated from the liquid 413. An electrolyte 430 fills any remaining volume of the chambers 412 and 414 and communicates through the hole 416 between the two chambers 412 and 414, this hole providing electrolyte bridging means. The float 424 and the relatively constant volume of the liquid 413 in the chamber 412 prevents the electrolyte 430 from leaving the reference cell by way of the liquid outlet 420. Thus, the electrolyte 430 provides electrochemical contact between the liquid 413 to be monitored in the first chamber 412 and the standard electrode 428 in the second chamber 414. The small hole 416 minimizes contamination of the standard electrode 428 by the liquid 413. However, a preferred construction within the chamber 414 for preventing contamination and for providing a reference electrode with a constant temperature comprises the following:

An open-top reservoir 432 for holding the reference electrode 428 fits into the lower part of the chamber 414, but is generally spaced from the walls of the chamber 414 except at its upper and bottom portions to define a space 434 around the reservoir 432. As shown in the drawing, the reservoir 432 fits against a lip 436 formed in the wall of the chamber 414 about half way up the wall, and a nut 438, when screwed on the lower end of the reservoir 432, which extends through the bottom wall of the chamber 414, forces the reservoir 432 against the lip 436 and also seals the lower end of the reservoir 432 with the bottom of the chamber 414. Any desired temperature of the reference electrode 428 can be maintained, therefore, by introducing water or other heat exchange media into the space 434 around the reservoir 432 through a water inlet 440 and removing it through a water outlet (not shown).

To minimize contamination of the reference electrode 428, a tongue 442 having an axial passage 444 therein depends from the top of the chamber 414 and fits into the open top of the reservoir 432. At least one small orifice 446 connects the passage 444 with the electrolyte 430 in the chamber 414 to form an electrolyte bridge between the main body of electrolyte 430 and the electrolyte filling the passage 444 in the tongue 442. This orifice 446 along with the small hole 416 minimizes the chances of the liquid 413 reaching the reference electrode 428. Other constructions which provide a small orifice between the main body of electrolyte 430 and the reference electrode 428 will be apparent to those in the art, but the one described is preferred since it is easily made and assembled. In addition, minutely porous members may be used instead of the small hole and orifice.

Vents 448 and 450 are preferably connected to the tops of the two chambers 412 and 414 in any suitable manner to allow for fluctuations in the volume of materials in the container 410 and to provide a means by which the electrolyte can be blanketed with an inert gas, if necessary or desirable. It will be manifest to those in the art that seal gaskets, such as those shown in the drawing, should be disposed in appropriate places in the reference cell construction to prevent undesirable leakage.

Electrical connections 452 and 454 are in electrical contact with the liquid 413 and the reference electrode 428 respectively. Since the liquid 413 and the reference electrode 428 form an electrochemical cell along with the electrolyte 430, the voltage between the liquid 413 and the reference electrode 428 can be recorded by a high impedance recorder connected to the electrical connections 452 and 454. Moreover, the voltage an be recorded continuously as the liquid 413 flows through the lower part of the first chamber 412. In addition, the high impedance recorder may be equipped with auxiliary features to regulate the concentration of the flowing liquid 413, for example, by adding an ingredient of the liquid 413 to raise its concentration.

Referring back to FIG. 1, the sodium amalgam supply system includes at least one pumping means 40 to circulate the amalgam up and over the anode 12 from the effluent end of the regenerator 28. Any pumping means compatible with sodium amalgam may be used for this purpose, but the following pumping means is preferred. As shown in FIG. 9, the preferred pumping means comprises a pump housing 500 having a chamber therein for containing an impellent means 504 and a packing chamber 506 communicating with the chamber for the impellent means 504. A drive shaft 508 is connected with the impellent means 504, and extends through the packing chamber 506 to where it is connected to a drive wheel 509. The drive shaft 508 is preferably supported by a sleeve bushing 510, such as a cast iron bushing or a bearing at the place where the impellent means chamber and packing chamber 506 meet.

An inner packing material 512, suitably made of a plurality of rings of graphited asbestos, is disposed in the packing chamber 506 around the drive shaft 508, and this is followed by a substantially rigid sleeve 514 disposed in the packing chamber 506 and around the drive shaft 508. Next, an outer packing material 516 is similarly disposed against the sleeve 514, and a means 518 for compressing the packing materials 512 and 516, e.g., a bolt which screws into the housing 500 or a metal sleeve which may be forced in against the packing material 516 by suitable means, is disposed at the end of the packing chamber 506. An inlet means 520 for introducing a rare gas into the packing chamber 506 is provided in the housing 500 near the sleeve 514.

When a rare gas is introduced into the packing chamber 506 through the inlet means 520 under a pressure greater than the output hydraulic pressure of the pump, the above-described pump minimized leakage of the sodium amalgam because virtually all leakage past the inner packing material 512 will be towards the pumped material rather than the opposite direction. Thus, the leakage of sodium amalgam and poisonous mercury vapors in the space around the pump are minimized, and operators of the sodium amalgam-oxidant battery are protected from such vapors.

The above-described pump may be made of any materials which are compatible with sodium amalgam. Tool steel (about 17% carbon by weight) is a preferred material for the housing 500, the impellent means 504, and the drive shaft 508, and graphited asbestos is preferred as the packing materials 512 and 516. The packing sleeve 514 axially aligned around the drive shaft 508 is preferably made of a substantially rigid material, such as cast iron. The gas introduced into the packing chamber 516 must be an inert or rare gas.

An improvement in the action of the above-described pump can be achieved by providing the packing sleeve 514 with a means for directing the gas introduced through the inlet means 520 to both of its ends, and also a means for permitting the gas to flow readily to the interior of the sleeve 514, such as a transverse opening 522. A sleeve 514 having at least one circumferential groove plus at least one axial groove for substantially the length of the sleeve on its outside surface, and at least one radial hole therein connecting at least one of the outside grooves with the interior of the sleeve 514 is a preferred construction along with a sleeve having a circumferential groove substantially or almost as wide as the length of the sleeve 514 and a radial hole, as shown in FIG. 9. These sleeve constructions provide means for conveying the gas to both the inner and outer seals of the packing materials 512 and 516, which is highly desirable since otherwise the pumped material will have a tendency to creep past both the outside and inside of the packing material 512. The pump construction of the invention also prevents air from entering the packing chamber 506 since the gas will leak out past the packing material 516 rather than air leak in. This is important when the pumped material will react with air, such as in the case of sodium amalgam.

The impellent means 504 can consist of any construction which is suitable for pumping the particular material in question. Rotary and centrifugal designs may be mentioned in this regard. In a sodium amalgam-oxidant battery system, a positive displacement rotary design is preferred since the flow of amalgam over the anode surface in the cell should be constant once an output power has been selected.

Referring back to FIG. 1, the sodium amalgam-oxidant battery there shown comprises an electrolyte circulation system for maintaining the electrolyte 16 at a proper concentration for maximum cell performance. The electrolyte circulation system preferably comprises an influent conveying means 42 communicating with the interior of the cell 10 near the bottom of the cell 10 but preferably above any collection of amalgam in the bottom of the cell 10, and an effluent conveying means 44 near the top of the cell 10. The influence conveying means 42 communicates with an electrolyte reserve tank 46, which can be filled with water or an electrolyte, or can be used as a mixing tank for mixing an electrolyte material such as sodium hydroxide with water to obtain a proper concentration in the electrolyte solution. A pumping means 48, which can be any pump suitable for electrolyte solutions such as a conventional centrifugal pump, is preferably disposed in the influent conveying means 42 to circulate the electrolyte. An amalgam separator 50 is placed in the effluent conveying means 44 to separate entrained amalgam from the effluent electrolyte. The separated amalgam may be returned to the mercury supply 36 as shown or may be disposed of as desired, and the effluent electrolyte stream may be discharged as waste or may be returned to the electrolyte tank for further use as shown.

The amalgam separator 50 may be any separator, conventional or otherwise, which will separate entrained amalgam from the effluent electrolyte. Referring now to FIGS. 10 and 11, the amalgam separator preferably comprises a cylindrical housing 600 closed at both ends and an inlet means 602 near the top of the housing and communicating with the interior of the housing substantially tangentially with the cylindrical wall of the housing 600, as better shown in FIG. 11. A sleeve 604 which is spaced from the cylindrical wall of the housing 600 to form an annular space 606 therebetween, extends from the bottom of the housing 600 toward the top of the housing 600 for at least a substantial distance, which may be defined as a distance which permits a pool of amalgam to collect in the bottom of the housing 600 around the outside of the sleeve 604 without permitting amalgam in other than minor entrained amounts from entering the interior of the sleeve 604. In general, this distance is equal to or greater than between ⅓ and one-half the interior length of the housing 600. An amalgam outlet means 608 communicates with the annular space 606 at the bottom of the housing 600, and an electrolyte outlet means 610 communicates with the interior of the sleeve 604 at the bottom of the housing 600. A venting means 612 is preferably disposed at the top of the housing 612 to control the pressure within the housing 600.

As shown in the drawing, the sleeve 604 preferably extends almost to the top of the housing 600, e.g., above the inlet means 602, and contains a plurality of holes 614 in its cylindrical wall, all of which must be above the top of a pool of amalgam which collects in the bottom of the housing 600 around the outside of the sleeve 604.

The mixture of electrolyte and entrained amalgam entering the housing 600 by way of the inlet means 602 is separated by the circular motion of the entering mixture caused by the tangential location of the inlet 602. Centrifugal force during the circular motion causes the heavier entrained amalgam to collect on the cylindrical wall of the housing 600, and the amalgam thus collected then flows down the wall to the bottom of the housing 600 where it forms a pool around the outside of the sleeve 604 and flows out of the housing through the amalgam outlet means 608. The pool of amalgam blocks the electrolyte from entering the amalgam outlet 608, and the electrolyte is thus forced through the holes 614 or the open end of the sleeve 604 into the interior of sleeve 604 where it flows out the electrolyte outlet 610. The effluent flow of amalgam may be adjusted by valves, orifices, or other means to maintain the proper level of the amalgam pool in the bottom of the housing 600.

A sodium amalgam-oxidant battery made in accordance with the invention has been successfully tested. Two cells were assembled for pilot plant tests, each containing four parallel-connected cathodes and four anode surfaces. Performance of the cells was observed during 39 "test days" covering a period of six months, the total period of actual operation being about 110 hours. During part of the operational period, the two cells were connected in series, thus constituting a battery. About 50 hours of the 110 hour period represented operation at about 90 amperes/sq. ft. Of the total operating period, about 71 hours were obtained with the two cells connected in series, including 14 hours at about 90 amperes/sq. ft. The battery was operated intermittently for times ranging from part of one day to several days in length (not continuously). During the latter part of the test period, two long runs were made on consecutive days; the first about 11¼ hours, the second 14½ hours, the second 14½ hours on the following day. The cell voltage on open circuit averaged about 1.92 volts, at 54 amps per square foot about 1.48 volts, and at about 90 amps per square foot about 1.25 volts.

While the foregoing description has been limited for the most part to a sodium amalgam system, it will be understood that other anodic liquid metal amalgams may be substituted for the sodium amalgam in the battery and components described herein. Additionally, it will be understood that aqueous solutions of other alkali metal hydroxides or halides may be used as the electrolyte. Although the details and constructions of the embodiments disclosed are based on the sodium amalgam system, they are of course generally applicable to anodic material amalgams.

What is claimed is:

1. An anodic material amalgam-oxidant fuel cell comprising
   (a) at least one cell comprising an electrolyte, an anode, and a cathode in electrochemical relationship with each other;
   (b) an electrolyte circulation system in communication with said cell for removing electrolyte from said cell and introducing electrolyte into said cell, said system including apparatus for separating a mixture of entrained amalgam in electrolyte;
   (c) an oxidant supply system communicating with said cathode;
   (d) an anodic material amalgam supply system communicating with said anode, said amalgam supply system comprising amalgam conveying means, the inlet end of which communicates with the top end of said anode and the effluent end of which communicates with the bottom of said cell, an amalgam regenerating means disposed in said amalgam conveying means for replenishing the anodic material content of said amalgam, said regenerating means comprising a housing having a reaction chamber therein, amalgam inlet and outlet means communicating with said reaction chamber and connected to said conveying means, and means communicating with said reaction chamber for controllably injecting required amounts of anodic material into said reaction chamber; at least one dielectric interrupter for preventing flow of electric current disposed in said conveying means, and pumping means for circulating the amalgam in said conveying means;
   (e) electrical lead means associated with said anode and said cathode;
   (f) said pumping means comprising impellent means for moving said material, a drive shaft connected to said impellent means, a housing over said impellent means and at least a portion of said drive shaft with said housing forming a packing chamber around said drive shaft, an inner packing material disposed in said packing chamber and around said drive shaft, a substantially rigid sleeve disposed around said drive shaft and against said inner packing material, said sleeve having a transverse opening therein connecting its interior with its exterior, an outer packing material disposed in said packing chamber against said sleeve, means fitting against said outer packing material for compressing said inner packing material and said outer packing material, thereby effectively sealing said packing chamber, an inlet means disposed in said housing and communicating with said packing chamber near said sleeve for pressurizing said chamber with a rare gas, and a rare gas in supply of said inlet means;
   (g) said amalgam regenerating means comprising depleted amalgam inlet means near the top of said chamber, enriched amalgam outlet means near the bottom of said chamber but above the lowest part of said chamber to allow a pool of amalgam to collect in said chamber; a sodium inlet nozzle at the top of said chamber; and means communicating with said nozzle for injecting sodium into said pool of amalgam; and
   (h) said dielectric interrupter comprising a vertically disposed hollow body, liquid inlet means at the top and liquid outlet means at the bottom of said body, and means within said body for dividing said liquid as it passes through said hollow body into at least one stream of discrete droplets which later collect in a liquid pool near said outlet means, said dielectric interrupter being nonconductive from said liquid inlet means to said liquid outlet means;
   (i) said apparatus for separating entrained amalgam in electrolyte comprising a cylindrical housing closed at both ends, a mixture inlet means near the top of said housing and communicating with the inetrior of said housing substantially tangentially with the cylindrical wall of said housing, a sleeve extending from the bottom of the housing toward the top of said housing, and amalgam outlet means near the bottom of said housing and outside of said sleeve, means cooperable with said amalgam outlet means for maintaining a pool of amalgam in said housing outside of said sleeve, and an electrolyte outlet means at the bottom of said housing and communicating only with the interior of said sleeve.

2. An anodic material amalgam-oxidant fuel cell comprising:
   (a) at least one cell comprising an electrolyte, an anode, and a cathode in electrochemical relationship with each other;
   (b) an electrolyte circulation system in communication with said cell for removing electrolyte therefrom and introducing electrolyte thereinto;
   (c) an oxidant supply system communicating with said cathode;
   (d) an anodic material amalgam supply system communicating with said anode, said amalgam supply system comprising amalgam conveying means the inlet end of which communicates with the top end of said anode and the effluent end of which communicates with the bottom of said cell, an amalgam regenerating means disposed in said amalgam conveying means for replenishing the anodic material content of said amalgam;
   (e) said amalgam regenerating means comprising a housing having a reaction chamber therein, depleted amalgam inlet means near the top of said chamber, an annular insert spaced from the wall of said chamber to form an annular space there around communicating with said amalgam inlet means, said insert at its bottom fitting against the wall of said chamber and its top forming a weir over which depleted amalgam can flow, means within said annular space for imparting a circular motion to said depleted amalgam as it flows over said weir, enriched amalgam outlet means near the bottom of said chamber but above the lowest part of said chamber to allow a pool of amalgam to collect in said chamber, a sodium inlet nozzle at the top of said chamber, and means communicating with said nozzle for injecting liquid sodium into said pool of amalgam;
(f) at least one dielectric interrupter for preventing flow of electric current disposed in said conveying means; and
(g) pumping means for circulating the amalgam in said conveying means.

3. A fuel cell according to claim 2 wherein a cylindrical screen is vertically disposed in the reaction chamber of said amalgam regenerating means, said screen being positioned between said amalgam outlet means and the center of said pool of amalgam.

4. An anodic material amalgam-oxidant fuel cell comprising
(a) at least one cell comprising an electrolyte, an anode, and a cathode in electrochemical relationship with each other;
(b) an electrolyte circulation system in communication with said cell for removing electrolyte therefrom and introducing electrolyte thereinto, said circulation system including an apparatus for separating a mixture of entrained amalgam in electrolyte comprising a cylindrical housing closed at both ends, a mixture inlet means near the top of said housing and communicating with the interior of said housing substantially tangentially with the cylindrical wall of said housing, a sleeve extending from the bottom of said housing toward the top of said housing, a dense liquid outlet means near the bottom of said housing and outside of said sleeve, means cooperable with said dense liquid outlet means for maintaining a pool of dense liquid in said housing outside of said sleeve but below the top of said sleeve, and a lighter liquid outlet means at the bottom of said housing and communicating only with the interior of said sleeve;
(c) an oxidant supply system communicating with said cathode;
(d) an anodic material amalgam supply system communicating with said anode, said amalgam supply system comprising amalgam conveying means, the inlet end of which communicates with the top end of said anode and the effluent end of which communicates with the bottom of said cell, an amalgam regenerating means disposed in said amalgam conveying means for replenishing the anodic material content of said amalgam, said regenerating means comprising a housing having a reaction chamber therein, amalgam inlet and outlet means communicating with said reaction chamber and connected to said conveying means, and means communicating with said reaction chamber for controllably injecting required amounts of anodic material into said reaction chamber;
(e) at least one dielectric interrupter for preventing flow of electric current disposed in said conveying means; and
(f) pumping means for circulating the amalgam in said conveying means.

5. An anodic material amalgam-oxident fuel cell comprising
(a) at least one cell comprising an electrolyte, an anode, and a cathode in electrochemical relationship with each other;
(b) an electrolyte circulation system in communication with said cell for removing electrolyte therefrom and introducing electrolyte thereinto;
(c) an oxidant supply system communicating with said cathode;
(d) an anodic material amalgam supply system communicating with said anode, said amalgam supply system comprising amalgam conveying means, the inlet end of which communicates with the top end of said anode and the effluent end of which communicates with the bottom of said cell, an amalgam regenerating means disposed in said amalgam conveying means for replenishing the anodic material content of said amalgam, said regenerating means comprising a housing having a reaction chamber therein, amalgam inlet and outlet means communicating with said reaction chamber and connected to said conveying means, and means communicating with said reaction chamber for controllably injecting required amounts of anodic material into said reaction chamber;
(e) at least one dielectric interrupter for preventing flow of electric current disposed in said conveying means and comprising a vertically disposed hollow body, liquid inlet means at the top and liquid outlet means at the bottom of said body, and means within said body comprising a distributor plate mounted within the top of said body and a plurality of closely spaced nozzles supported within said distributor plate for dividing said liquid as it passes through said hollow body into at least one stream of discrete droplets which later collect in a liquid pool near said outlet means, said dielectric interrupter being non-conductive from said liquid inlet means to said liquid outlet means; and
(f) pumping means for circulating the amalgam in said conveying means.

6. An anodic material amalgam-oxidant fuel cell comprising
(a) at least one cell comprising an electrolyte, anode, and a cathode in electrochemical relationship with each other;
(b) an electrolyte circulation system in communication with said cell for removing electrolyte therefrom and introducing electrolyte thereinto;
(c) an oxidant supply system communicating with said cathode;
(d) an anodic material amalgam supply system communicating with said anode, said amalgam supply system comprising amalgam conveying means, the inlet end of which communicates with the top end of said anode and the effluent end of which communicates with the bottom of said cell, an amalgam regenerating means disposed in said amalgam conveying means for replenishing the anodic material content of said amalgam, said regenerating means comprising a housing having a reaction chamber therein, amalgam inlet and outlet means communicating with said reaction chamber and connected to said conveying means, and means communicating with said reaction chamber for controllably injecting required amounts of anodic material into said reaction chamber;
(e) at least one dielectric interrupter for preventing flow of electric current disposed in said conveying means; and
(f) pumping means for circulating the amalgam in said conveying means comprising impellent means for moving said material, a drive shaft connected to said impellent means, a housing over said impellent means and at least a portion of said drive shaft with said housing forming a packing chamber around said drive shaft, an inner packing material disposed in said packing chamber and around said drive shaft, a substantially rigid sleeve disposed around said drive shaft and against said inner packing material, said sleeve having a transverse opening therein connecting its interior with its exterior, an outer packing material disposed in said packing chamber against said sleeve, means fitting against said outer packing material for compressing said inner packing material and said outer packing material, thereby effectively sealing said packing chamber, an inlet means disposed in said housing and communicating with said packing chamber near said sleeve for pressurizing said chamber with a rare gas, and a rare gas supply communicating with said inlet means.

References Cited

UNITED STATES PATENTS

| | | | |
|---|---|---|---|
| 3,161,546 | 12/1964 | Yeager et al. | 136—86 |
| 2,840,240 | 6/1958 | Snyder | 210—512 |
| 2,929,508 | 3/1960 | Folz | 210—512 |
| 3,072,464 | 1/1963 | Akaboshi et al. | 23—283 |
| 3,156,534 | 11/1964 | Josephson et al. | 23—283 |
| 2,431,221 | 11/1947 | Allen | 103—103 |
| 2,295,810 | 9/1942 | Sladky | 103—103 |

OTHER REFERENCES

Chemical Engineering Progress, vol. 57, No. 2, pages 140, 142, February 1961.

ALLEN B. CURTIS, *Primary Examiner.*

WINSTON A. DOUGLAS, *Examiner.*

H. FEELEY, *Assistant Examiner.*